United States Patent
Park

(10) Patent No.: US 7,506,401 B2
(45) Date of Patent: Mar. 24, 2009

(54) WIPER ARM ADAPTOR FOR CAR

(76) Inventor: Se-Heon Park, 406-203, Saetbyeolmaeul, Bundang-Dong 39, Bundang-Gu, Seongnam-Si, Gyeonggi-Do (KR)

( * ) Notice: Subject to any disclaimer, the term of this patent is extended or adjusted under 35 U.S.C. 154(b) by 0 days.

(21) Appl. No.: 11/562,723

(22) Filed: Nov. 22, 2006

(65) Prior Publication Data

US 2007/0192984 A1    Aug. 23, 2007

(30) Foreign Application Priority Data

Feb. 20, 2006   (KR) ................. 10-2006-0016099

(51) Int. Cl.
  *B60S 1/40*   (2006.01)
(52) U.S. Cl. ................ 15/250.32; 15/250.201; 15/250.44
(58) Field of Classification Search ............. 15/250.46, 15/250.32, 250.201, 250.44, 250.361, 250.43
  See application file for complete search history.

(56) References Cited

U.S. PATENT DOCUMENTS

| | | | | |
|---|---|---|---|---|
| 3,585,672 A | * | 6/1971 | Habert | ............ 15/250.46 |
| 5,070,573 A | * | 12/1991 | Journee et al. | ............ 15/250.32 |
| 5,435,041 A | * | 7/1995 | Ho | ............ 15/250.32 |
| 6,789,289 B2 | | 9/2004 | Roodt | |
| 6,792,644 B2 | | 9/2004 | Roodt | |
| 2006/0130263 A1 | * | 6/2006 | Coughlin | ............ 15/250.32 |
| 2006/0230571 A1 | * | 10/2006 | Son | ............ 15/250.32 |

FOREIGN PATENT DOCUMENTS

| | | | |
|---|---|---|---|
| CH | 611563 | * | 6/1979 |
| FR | 2846616 | * | 5/2004 |

* cited by examiner

*Primary Examiner*—Gary K Graham
(74) *Attorney, Agent, or Firm*—IPLA P.A.; James E. Bame

(57) ABSTRACT

An adaptor and coupling structure of a vehicular wiper arm are provided. The adaptor has an altered pin coupling structure that is capable of coupling to a variety of wiper arms without using rivets, is easily coupled without manipulating the pin of a wiper arm, is coupled to pivot centrally around a wiper frame, and increases the pivoting supporting strength of a wiper. The pin coupling structure includes a pivoting portion pivotably inserted in a mounting bracket of the wiper frame. The pivoting portion forms a hollow part that guides and couples with the pin of the wiper arm. The wiper frame forms a guide notch for guiding and coupling with the pivoting portion.

4 Claims, 5 Drawing Sheets

WIPER ARM ADAPTOR FOR CAR

CROSS REFERENCE

Applicant claims foreign priority under Paris Convention and 35 U.S.C. § 119 to the Korean Patent Application No. 10-2006-0016099, filed Feb. 20, 2006 with the Korean Intellectual Property Office.

BACKGROUND OF THE INVENTION

1. Field of the Invention

The present invention relates to an adaptor and coupling structure of a vehicular wiper arm, and more particularly, to a wiper arm adaptor with an altered pin coupling structure that is capable of coupling to a variety of wiper arms without using rivets, is easily coupled without manipulating the pin of a wiper arm, is coupled to pivot the adaptor centrally around a wiper frame, and increases the pivoting supporting strength of a wiper.

2. Description of the Related Art

A vehicular wiper, as shown in FIGS. 1 and 2, couples a wiper arm (that moves a wiper blade) to a frame 11 through an adaptor 10.

FIG. 1 shows a structure for coupling an adaptor 10 to a frame 11 by permanently fixing a rivet 12a at the center of a mounting slot 12. Here, the rivet 12a functions to fix the adaptor 10 and reinforce the frame 11. Because the rivet 12a needs a separate riveting process to couple to the frame 11 (increasing the manufacturing process), it also requires additional parts, which can interfere with adjacent parts and limit the degree freedom in wiper design.

FIG. 2 shows another coupling structure of a wiper frame 11 to a wiper arm. A mounting slot 12 is first formed in the wiper frame 11, and an adaptor 10 is positioned therein. A fastening pin 13 is then used to fasten the adaptor 10 to the frame 11.

The structure of the wiper arm 14 for coupling to the adaptor 10 can adopt various configurations and shapes. The shape of the terminal coupling portion of the wiper arm 14 for coupling to the adaptor 10 can be grouped into two general categories: hooked-type and pin-type connectors.

FIG. 3A shows a hooked-type connector at the end of a wiper arm 14 plate having a coupling slot 15 that fits over and couples with a protruding portion formed on the adaptor 10.

FIG. 3B shows a pin-type connector having a pin 16 protruding from a side at the end of the head of the wiper arm 14, where the adaptor 10 is coupled to the pin 16.

The coupling direction and structure of the wiper arm 14 is formed to correspond to the shape of the coupling portion at the end of the wiper arm 14.

That is, if the wiper arm is a hooked-type arm, it inserts into the adaptor 10 from the top thereof; however, a pin-type arm inserts the pin 16 of the wiper arm 14 from the side of the wiper blade frame, as shown in FIG. 4.

Thus, because the role of an adaptor 10 is to mount the wiper arm 14 to the frame 11, adaptors have been developed to accommodate the mounting of a variety of wiper arm 14 structures and specifications in both hooked and pin-types.

FIG. 4 shows a wiper arm frame with two small pin holes 18 and 19 formed therein at different locations to couple with a pin 16 of a wiper arm 14 having a different diameter.

However, because the two smaller pin holes 18 and 19 come in only two sizes, only two sizes of wiper arm 14 pins are compatible with this type of frame 11. Also, because the central hole of the frame 11 has a fastening pin 13 inserted therein for fastening the adaptor 10 to the frame 11, this hole cannot be used. In order to couple the pin 16 of the wiper arm in the adaptor 10, the pin 16 is inserted in the pin hole 18 and 19, and the corresponding hole of the adaptor 10 must be aligned precisely for the pin 16 to pass through, so that the coupling is inconvenient. The adaptor 10 functions to simply support the wiper arm 14 to be able to pivot against the frame 11, and is seated and fixed to the frame 11 by only the fastening pin 13. Therefore, it is difficult to maintain a firm coupling, and the supporting strength weakens over time. Because the fastening pin 13 used is generally a rivet, the riveting process permanently fixes the frame 11, so that reinforcing of the frame 11 necessitates a coupling of the adaptor 10 and a separate riveting process, increasing the number of parts and complicating the process. The pin 16 of the wiper arm 14 cannot be inserted into the riveted fastening pin 13, so that a small area must be used, which limits freedom of design.

Furthermore, the adaptor 10 does not have a role other than fixing the wiper arm 14 to the frame 11, and is located in an area subject to much wind resistance, so that it can cause wind-induced streaking and judder.

SUMMARY OF THE INVENTION

Accordingly, the present invention is directed to a vehicle wiper arm adaptor that substantially obviates one or more problems due to limitations and disadvantages of the related art.

An object of the present invention is to provide a simplified adaptor allowing facile coupling of a wiper arm and frame without a riveting process. By altering the shape and structure of the adaptor and frame, the pin on the wiper arm does not have to be manipulated for obtaining a simple coupling, and separate rivets do not have to be used, reducing the number of parts required.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an adaptor inserted and installed on a mounting bracket of a wiper frame having a wiper blade installed thereon, the adaptor forming a pin hole for guiding and inserting a pin of a wiper arm, wherein the wiper frame forms a hole corresponding to the pin hole, the adaptor including: a pivoting portion pivotably inserted along the mounting bracket, and including an integrally formed hollow part for guiding and coupling with the pin of the wiper arm.

In another aspect of the present invention, there is provided a coupling structure of a wiper including: a wiper arm including a pin on an end thereof; a wiper frame including a mounting bracket that defines a guide notch; and an adaptor inserted and installed on the mounting bracket, wherein the adaptor includes: a pin hole formed therein for selectively receiving the pin; and an integrally formed pivoting portion guided and pivotably inserted in the guide notch, and having a hollow part for selectively guiding and coupling with the pin.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in FIGS. 5 through 10. Wherever possible, the same reference numbers will be used throughout the drawings to refer to the same or like parts.

Figure 1:
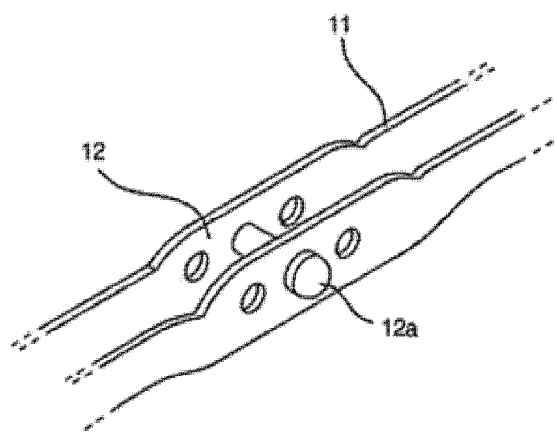
FIG. 1 is a perspective view of a wiper arm coupling structure according to the related art.
Figure 2:
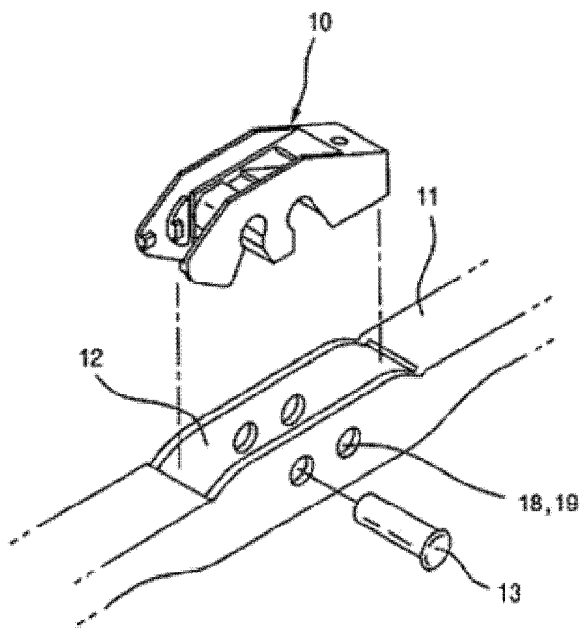
FIG. 2 is a perspective view of another wiper arm coupling structure according to the related art.
Figure 3A:
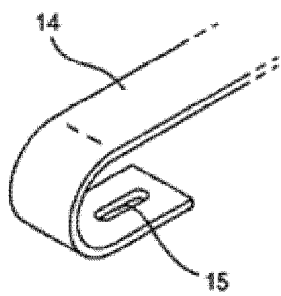
FIG. 3A is a perspective view of a hooked-type wiper arm according to the related art.
Figure 3B:
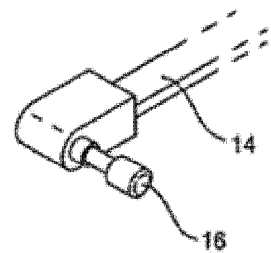
FIG. 3B is a perspective view of a pin-type wiper arm according to the related art.
Figure 4:
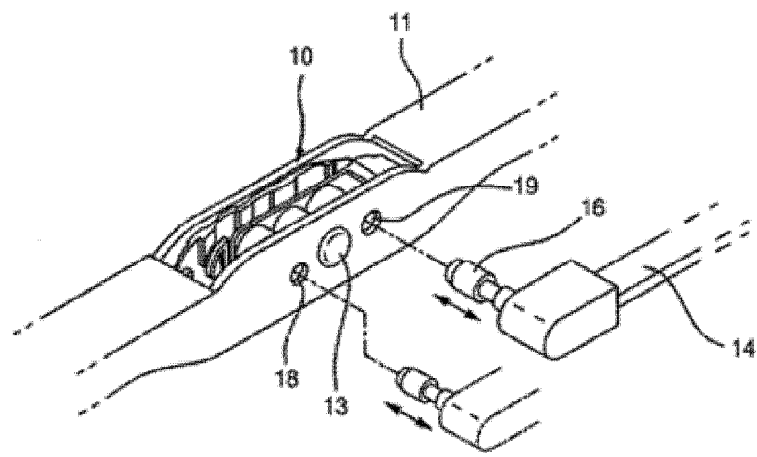
FIG. 4 is a perspective view showing a pin coupling structure according to the related art.
Figure 5:
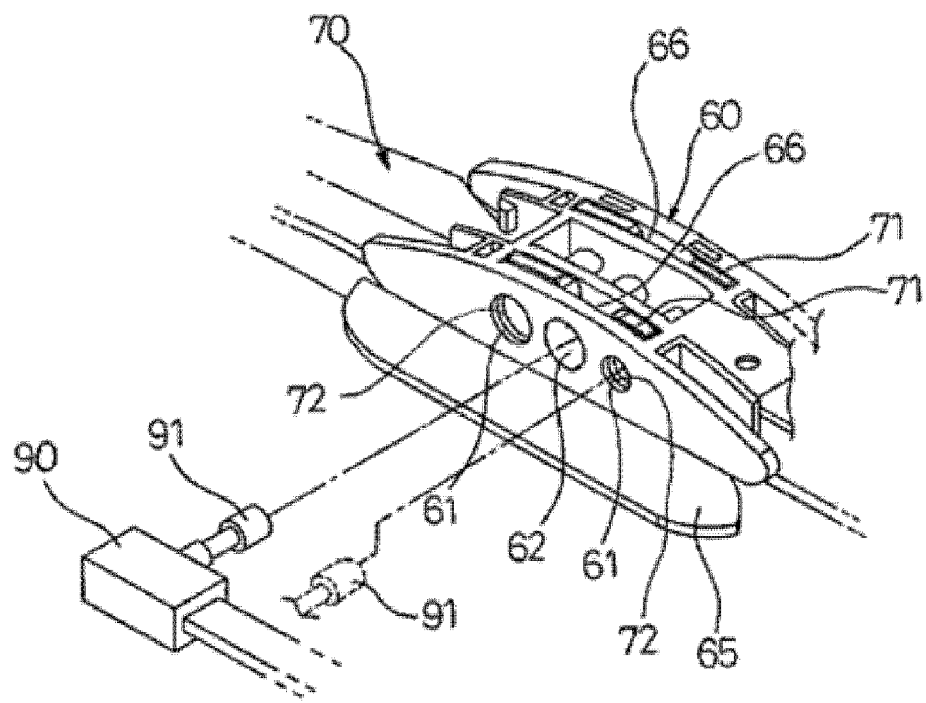
FIG. 5 is a perspective view showing a pin coupling structure according to an embodiment of the present invention.

FIG. 5 is a perspective view showing a pin coupling structure according to an embodiment of the present invention.

Figure 6:
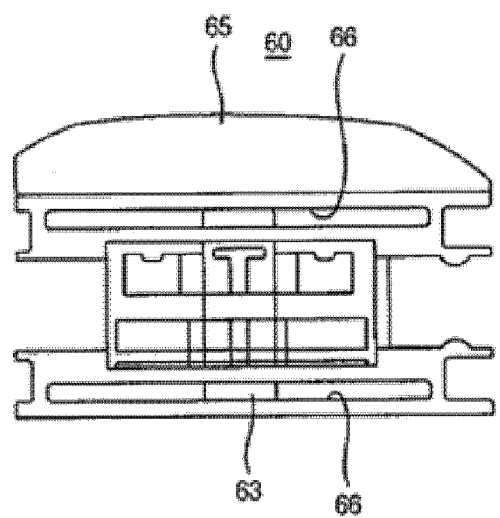
FIG. 6 is a plan view of a wiper arm adaptor according to an embodiment of the present invention.
Figure 7:
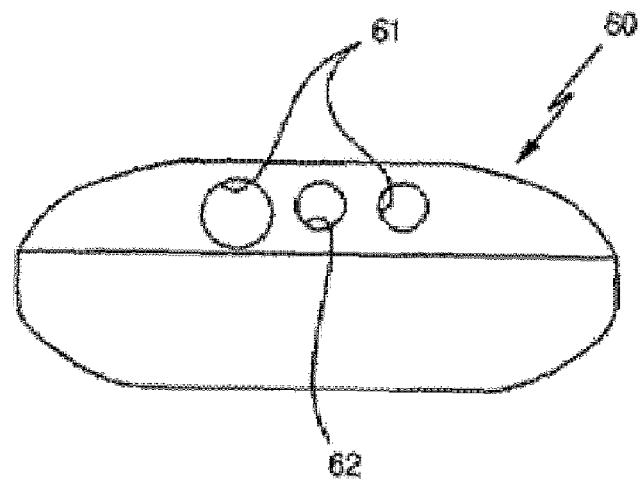
FIG. 7 is a frontal view of a wiper arm adaptor according to an embodiment of the present invention.
Figure 8:
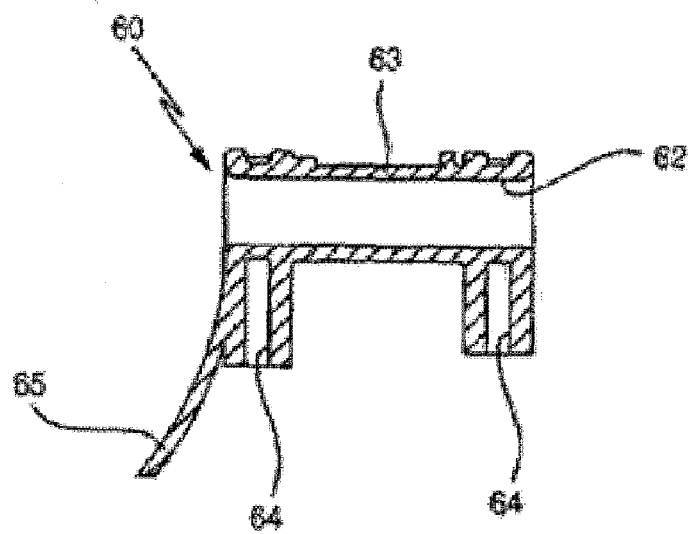
FIG. 8 is a sectional view of a wiper arm adaptor according to an embodiment of the present invention.

FIG. 6 is a plan view of a wiper arm adaptor according to an embodiment of the present invention. FIG. 7 is a frontal view of a wiper arm adaptor according to an embodiment of the present invention. FIG. 8 is a sectional view of a wiper arm adaptor according to an embodiment of the present invention.

Figure 9:
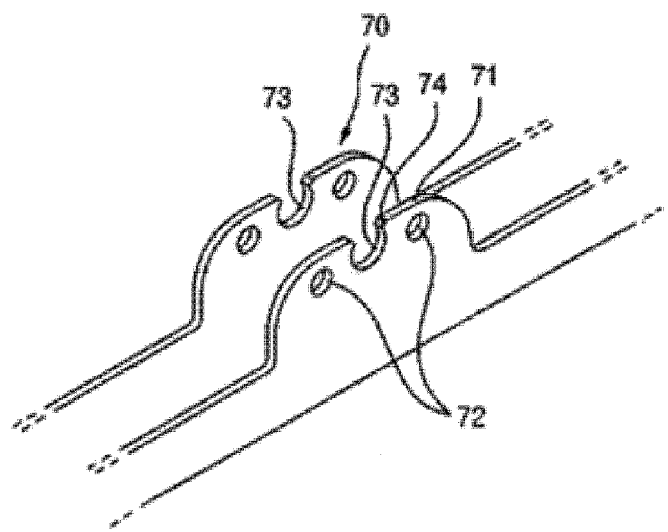
FIG. 9 is a perspective view showing a wiper frame structure for coupling with an adaptor according to an embodiment of the present invention.
Figure 10:
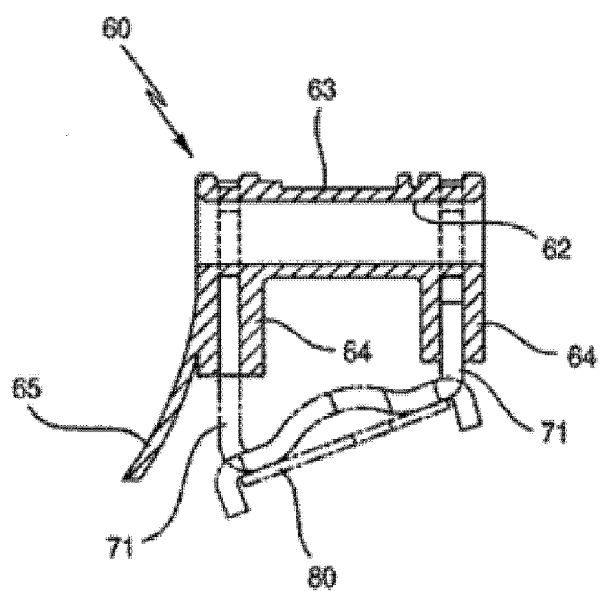
FIG. 10 is a sectional view showing a coupled wiper adaptor according to an embodiment of the present invention.

FIG. 9 is a perspective view showing a wiper frame structure for coupling with an adaptor according to an embodiment of the present invention. FIG. 10 is a sectional view showing a coupled wiper adaptor according to an embodiment of the present invention.

A wiper arm adaptor 60 according to embodiments of the present invention is shown in FIGS. 5 through 10.

Referring to FIGS. 5 through 10, an adaptor 60 for a wiper arm according to the present invention is pivotably inserted and installed on a mounting bracket 71 of a wiper frame 70 having a wiper blade 80.

The adaptor 60 forms a pin hole 61 in which a pin 91 of a wiper arm 90 inserts, and the wiper frame 70 forms a hole 72 corresponding to the pin hole 61, so that the wiper arm adaptor 60 may be installed on the wiper frame 70.

In further detail, when the adaptor 60 is fitted onto the mounting bracket 71 of the wiper frame 70, in order to allow a pivotable mounting thereof, a pivoting portion 63 is integrally formed and has a hollow part 62 to receive and couple with the pin 91 of the wiper arm 90.

A rib 64 extends downward on the adaptor 60 to mount over the mounting bracket 71 of the wiper frame 70.

The adaptor 60 may also include an air spoiler 65 formed thereon for directing oncoming air in an upward direction.

In the coupling structure of the wiper adaptor according to the present invention (as shown in FIGS. 5, 9, and 10), in order to pivotably insert and mount the adaptor 60 on the mounting bracket 71 of the wiper frame 70 having the wiper blade 80 mounted thereon, the adaptor 60 forms the pin hole 61 for inserting the pin 91 of the wiper arm 90, and the wiper frame 70 forms a hole 72 corresponding to the pin hole 61, in order to install the adaptor 60 on the wiper arm 90.

More specifically, the adaptor 60 has a pivoting portion 63 that is integrally formed and includes a hollow part 62 to receive and couple with the pin 91 of the wiper arm 90 when the adaptor 60 is fitted onto the mounting bracket 71 of the wiper frame 70, in order to allow a pivotable mounting thereof.

The wiper frame 70, on which the adaptor 60 is mounted, has a guide notch 73 for guiding and coupling the pivoting portion 63 of the adaptor 60.

Also, the guide notch 73 formed on the wiper frame 70, for guiding the pivoting portion 63 of the adaptor 60, may be formed symmetrically in both directions to balance the overall pivoting of the adaptor 60 and prevent gaps.

The guide notch 73 formed on the wiper frame 70 may be formed on the end portion of the mounting bracket 71 of the wiper frame 70, and a sloping surface 74 may be formed at the edge of the guide notch 73 in order to facilitate the insertion of the pivoting portion 63 of the adaptor 60.

The effects of the wiper arm adaptor and its coupling structure according to the present invention are as follows.

The wiper arm adaptor 60 according to the present invention, as shown in FIGS. 5 through 10, has a coupling slot 66 formed vertically and symmetrically on both sides thereof for sliding over both portions of the mounting bracket 71 when seating the adaptor 60 over the mounting bracket 71 of the wiper frame 70.

The wiper frame 70 includes the mounting bracket 71 for mounting the adaptor 60, so that when the adaptor 60 is pressed into the mounting bracket 71 to be assembled with the wiper frame 70, the pin hole 61 and hole 72 are mutually aligned for guiding the coupling of the pin 91 of the wiper arm 90.

When the adaptor 60 is inserted over the mounting bracket 71 of the wiper frame 70, it is pivotably coupled through the pivoting portion 63. The pivoting portion 63 has a hollow part 62 for guiding the pin 91 of the wiper arm 90—that is, the hollow part 62 is formed in the pivoting portion 63 that is installed in the mounting bracket 71 of the wiper frame 70. The pivoting part 63 is formed integrally on the main body of the adaptor and is coupled to the wiper frame 70 without the use of other rivets or fasteners. The hollow part 62 formed in the pivoting portion 63 may be used as an alternate hole to the pin hole 61 for receiving the pin 91 of the wiper arm 90.

The rib 64 is formed downwards on the adaptor 60 to be inserted over the mounting bracket 71 of the wiper frame 70.

Also, the air spoiler 65 may be disposed on the adaptor to direct oncoming air upward, in order to reduce air resistance when driving.

Thus, the adaptor 60 according to the present invention can be coupled to the wiper frame 70 without separate rivets or fasteners, to alleviate many problems associated with a wiper structure according to the related art that uses a pre-riveted frame, which is then coupled at its center to an adaptor.

As shown in FIGS. 5, 9, and 10, in the wiper arm adaptor according to the present invention, the pivoting portion 63 of the adaptor 60 is inserted along the mounting bracket 71 of the wiper frame 70.

The integrally formed pivoting portion 63 of the adaptor 60 has a hollow part 62 that guides and couples the pin 91 of the wiper arm 90. The pivoting portion 63, having the hollow part 62, pivotably mounts to the mounting bracket 71 of the wiper frame 70.

To guide and couple the pivoting portion 63 of the adaptor 60, a guide notch 73 is provided at the edge portion of the mounting bracket 71 of the wiper frame 70. In this way, the adaptor 60 can be easily and firmly coupled to the wiper arm without movement of the frame 70 or gaps created.

The guide notch 73, for guiding the pivoting portion 63 of the adaptor 60 at the edge portion of the mounting bracket 71 of the wiper frame 70, is formed symmetrically on both sides, so that when the pivoting portion 63 of the adaptor 60 is coupled thereto and pivots, an unbalanced pivoting or the formation of gaps can be prevented. The guide notch 73 formed, in the mounting bracket 71 of the wiper frame 70, forms the sloped surface 74 to facilitate guiding and coupling of the pivoting portion 63 of the adaptor 60.

The present invention uses the pivoting portion 63 of the adaptor 60 to fix the adaptor 60 to the frame 70, without using rivets. At the same time, the pivoting portion 63 forms the hollow part 62 within with the adjacent pin hole 61 in order to allow a variety of pins 91 of wiper arms 90 to be easily fixed to the frame without further manipulation. That is, the aligned pin holes 61 (including the hollow part 62) allow a wide assortment of pins 91 of wiper arms 90 to be fastened thereto.

The wiper arm adaptor and its coupling structure according to the present invention allows a simple coupling without manipulating the wiper arm pin, while eliminating the need for a rivet (that was coupled to the frame for reinforcing the frame and coupling the frame to the wiper arm in the related art). By not using a rivet, the number of parts, the number of manufacturing processes, and resultantly, the cost of the simplified manufacturing of the wiper are reduced. Also, an assortment of wiper arms may be coupled to the frame. Additionally, when the adaptor is coupled to the frame using the pivoting portion, judder or other problems due to movement of the adaptor or a gap formed can be prevented, providing a high-quality wiper.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An adaptor inserted and installed on a mounting bracket of a wiper frame having a wiper blade installed thereon, the adaptor comprising:
   a pivoting portion configured to be inserted along the mounting bracket and defining a downwardly facing convex arcuate surface;
   a pin hole for guiding and inserting a first pin of a wiper arm;
   a rib extended downwardly from adaptor, wherein the rib is mounted over an upper edge of the mounting bracket of the wiper frame, and
   a hollow part integrally formed within the pivoting portion for guiding and coupling with a second pin of a wiper arm,
   wherein the wiper frame forms a hole corresponding to the pin hole,
   wherein the pivoting portion is guided and coupled by a guide notch provided in the wiper frame, and
   wherein the guide notch has an upwardly facing open end and defines an upwardly facing concave arcuate surface therein receiving and fixing with the arcuate surface of the pivoting portion.

2. The adaptor according to claim 1, further comprising an air spoiler for directing oncoming air in an upward direction.

3. A coupling structure of a wiper comprising:
   a wiper arm including one of a first and second pins;
   a wiper frame including a mounting bracket that defines a guide notch; and
   an adaptor inserted and installed on the mounting bracket, wherein the adapter includes:
      a pin hole formed therein for receiving the first pin;
      a pivoting portion configured to be inserted along the mounting bracket and defining a downwardly facing convex arcuate surface;
      a hollow part formed in the pivoting portion for guiding and coupling with the second pin; and
      a rib extending downwardly from the adaptor,
   wherein the wiper frame forms a hole corresponding to the pin hole,
   wherein the rib is mounted over an upper edge of the mounting bracket of the wiper frame,
   and wherein the guide notch has an upwardly facing open end and defines an upwardly facing concave arcuate surface therein receiving and fixing with the convex arcuate surface of the pivoting portion.

4. The coupling structure according to claim 3, wherein the guide notch is formed symmetrically in duplicate.

* * * * *